United States Patent
Barraci et al.

(10) Patent No.: US 10,040,550 B2
(45) Date of Patent: Aug. 7, 2018

(54) PROCEDURE DESCRIPTION LANGUAGE AND OPERATIONAL RULE FILE

(71) Applicant: THE BOEING COMPANY, Chicago, IL (US)

(72) Inventors: Nima Barraci, Hessen (DE); Nils Kneuper, Neu-Isenberg (DE); Michal Narwojsz, Gdansk (PL); Matthew B. Hendrian, Englewood, CO (US); Karol Szklarski, Gdansk (PL)

(73) Assignee: THE BOEING COMPANY, Chicago, IL (US)

( * ) Notice: Subject to any disclaimer, the term of this patent is extended or adjusted under 35 U.S.C. 154(b) by 197 days.

(21) Appl. No.: 14/836,097

(22) Filed: Aug. 26, 2015

(65) Prior Publication Data
US 2017/0061802 A1    Mar. 2, 2017

(51) Int. Cl.
*G08G 5/00* (2006.01)
*B64C 39/02* (2006.01)

(52) U.S. Cl.
CPC .............. *B64C 39/02* (2013.01); *G08G 5/006* (2013.01); *G08G 5/0034* (2013.01); *G08G 5/0039* (2013.01); *G08G 5/0069* (2013.01); *B64C 2201/021* (2013.01); *B64C 2201/141* (2013.01)

(58) Field of Classification Search
CPC .............. B64C 39/02; B64C 2201/141; B64C 2201/021; G08G 5/0034; G08G 5/0039; G08G 5/006; G08G 5/0069
See application file for complete search history.

(56) References Cited

U.S. PATENT DOCUMENTS

| | | | | |
|---|---|---|---|---|
| 5,738,311 | A * | 4/1998 | Fernandez | B61L 15/0027 246/168 |
| 8,838,302 | B2 * | 9/2014 | Kumar | B60L 15/38 180/14.1 |
| 2008/0183345 | A1 * | 7/2008 | Chandra | B61L 3/006 701/19 |
| 2010/0063657 | A1 * | 3/2010 | Kumar | B61L 15/0072 701/19 |
| 2012/0277940 | A1 * | 11/2012 | Kumar | B61L 27/0027 701/20 |

FOREIGN PATENT DOCUMENTS

EP           2667274 A1     11/2013

* cited by examiner

Primary Examiner — Richard M Camby
(74) Attorney, Agent, or Firm — Patterson + Sheridan, LLP

(57) ABSTRACT

Method and apparatus for planning and modifying a vehicle operation plan. A vehicle operation plan for a vehicle schedule is determined based on performance constraints of the vehicle and an operational rule file that defines operational restrictions on the vehicle based on states of the vehicle. In the event a state changes from a planned state, the vehicle automatically and autonomously recalculates the vehicle operation plan in a manner that satisfies the performance constraints and the operational restrictions.

20 Claims, 7 Drawing Sheets

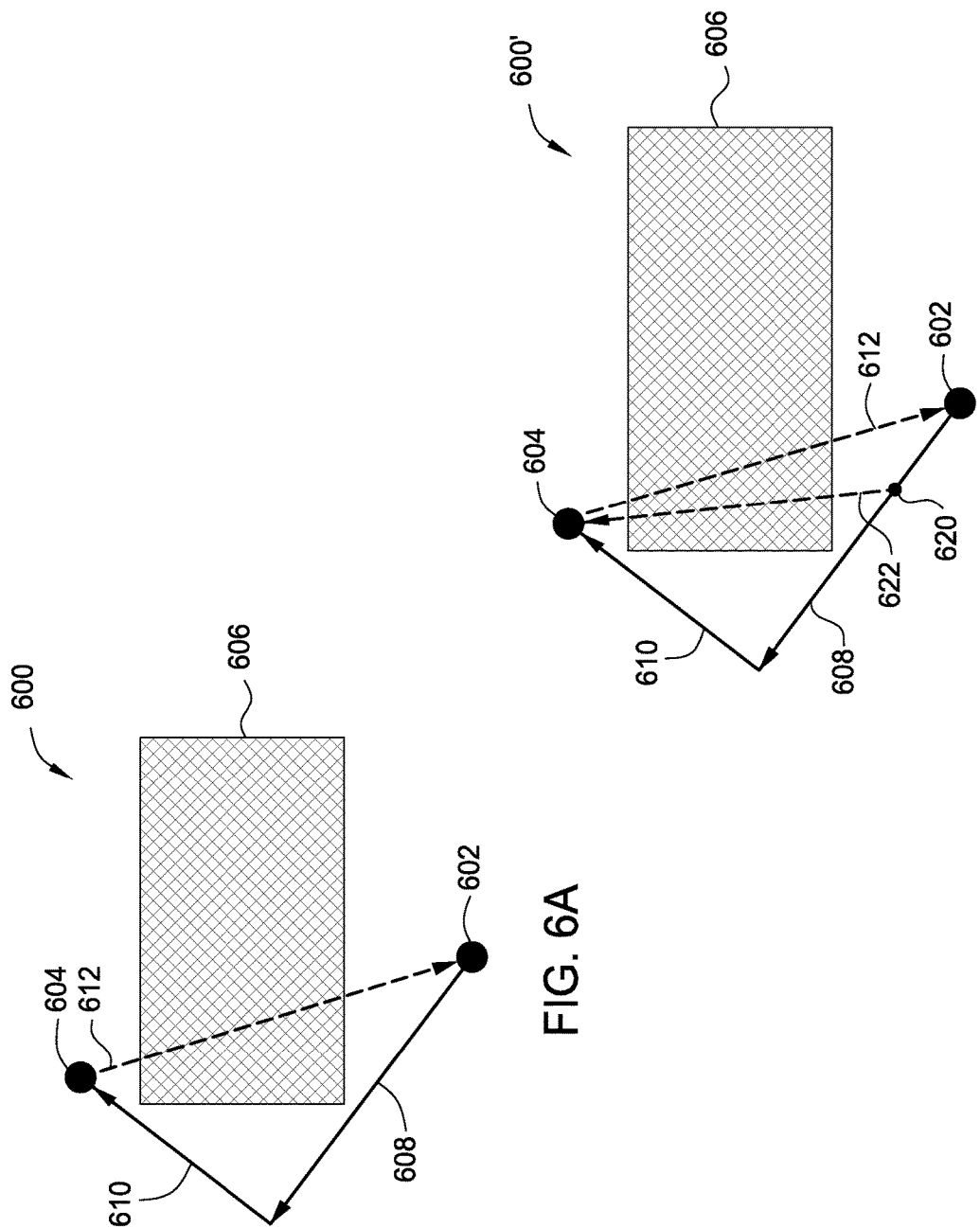

PROCEDURE DESCRIPTION LANGUAGE AND OPERATIONAL RULE FILE

BACKGROUND

Aspects of the present disclosure relate to flight planning, and more specifically, to applying operational rules and operational capabilities to limit flight planning and replanning to routes that are within the capabilities of the aircraft and compliant with rules specifying where the aircraft can fly.

Unmanned aerial vehicles (UAVs) are being used in many applications. In some instances, UAVs are capable of autonomous operation, following a preset flight plan to complete an objective, such as carrying a payload to a drop point and then returning. In the event the objective changes, a state of the UAV changes, or a complication arises during a flight, the autonomous UAV does not have the capability of plotting an alternate route that avoids areas that the UAV is not permitted to fly (based on the changes) and that is within the capabilities of the UAV.

SUMMARY

According to one aspect, a computer-implemented method includes receiving a procedure description for a vehicle. The procedure description defines performance constraints of the vehicle. The method also includes receiving at least one operational rule defining vehicle operating restrictions based on states of the vehicle. The method also includes receiving a vehicle operation schedule for the vehicle that includes one or more planned states of the vehicle during the vehicle operation schedule. The method also includes extracting one or more vehicle operating restrictions from the at least one operational rule for the vehicle based on the one or more planned states of the vehicle. The method also includes generating a vehicle operation plan, based on the vehicle operation schedule, that satisfies the performance constraints and extracted vehicle operating restrictions. The method also includes providing instructions to the vehicle such that the vehicle executes the vehicle operation plan.

According to at least one aspect, a system includes an unmanned aerial vehicle (UAV) with flight components. The system also includes a computer-readable storage medium arranged on board the UAV and adapted to store procedure description data for the UAV. The procedure description data defines performance constraints of the UAV. The computer-readable storage medium is also adapted to store operational rule data. The operational rule data defines vehicle operating restrictions based on states of the UAV. The computer-readable storage medium is also adapted to store a vehicle operation plan for the UAV that includes one or more planned states of the UAV during the vehicle operation plan, wherein the vehicle operation plan satisfies the performance constraints and the vehicle operating restrictions. The system also includes a computer processor on board the UAV and operable to generate control commands for the flight components such that the UAV executes the vehicle operation plan. The computer processor is also operable to output the control commands to the flight components.

According to at least one aspect, a computer program product for planning a vehicle operation is provided. The computer program product includes a computer-readable storage medium having computer-readable program code embodied therewith. The computer-readable program code is executable by one or more computer processors to receive a vehicle operation schedule for the vehicle that includes one or more planned states of the vehicle during the vehicle operation schedule. The computer-readable program code is also executable to retrieve performance constraints for the vehicle from procedure description data. The computer-readable program code is also executable to retrieve vehicle operating restrictions for the vehicle, based on the planned states of the vehicle, from operational rule data. The computer-readable program code is also executable to generate a vehicle operation plan, based on the received vehicle operation schedule, that satisfies the performance constraints and extracted vehicle operating restrictions. The computer-readable program code is also executable to output instructions to the vehicle such that the vehicle executes the vehicle operation plan.

BRIEF DESCRIPTION OF THE SEVERAL VIEWS OF THE DRAWINGS

FIG. 6A is a top view of a first exemplary initial vehicle operation plan subject to an operational rule file and a procedure description language generator;

FIG. 6B is a top view of a first modified vehicle operation plan subject to an operational rule file and a procedure description language generator after an event changes the initial vehicle operation plan shown in FIG. 6A;

DETAILED DESCRIPTION

In the following, reference is made to aspects presented in this disclosure. However, the scope of the present disclosure is not limited to specific described aspects. Instead, any combination of the following features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the following aspects, features, and advantages are merely illustrative and are not considered elements or limitations of the appended claims except where explicitly recited in a claim(s). Likewise, reference to "the invention" or to "the disclosure" shall not be construed as a generalization of any inventive subject matter disclosed herein and shall not be considered to be an element or limitation of the appended claims except where explicitly recited in a claim(s).

In various aspects described herein, a procedure description language (PDL) generator provides operational capabilities of a vehicle to a mission generator and an operational rule file provides operating restrictions for the vehicle to the mission generator. The mission generator uses the provided operational capabilities and operating restrictions to output a vehicle operation plan. Thereafter, if a state of the vehicle changes from a planned state while the vehicle is operating autonomously, the vehicle can reconfigure its mission in a manner that continues to satisfy the operational capabilities and operating restrictions.

Figure 1:
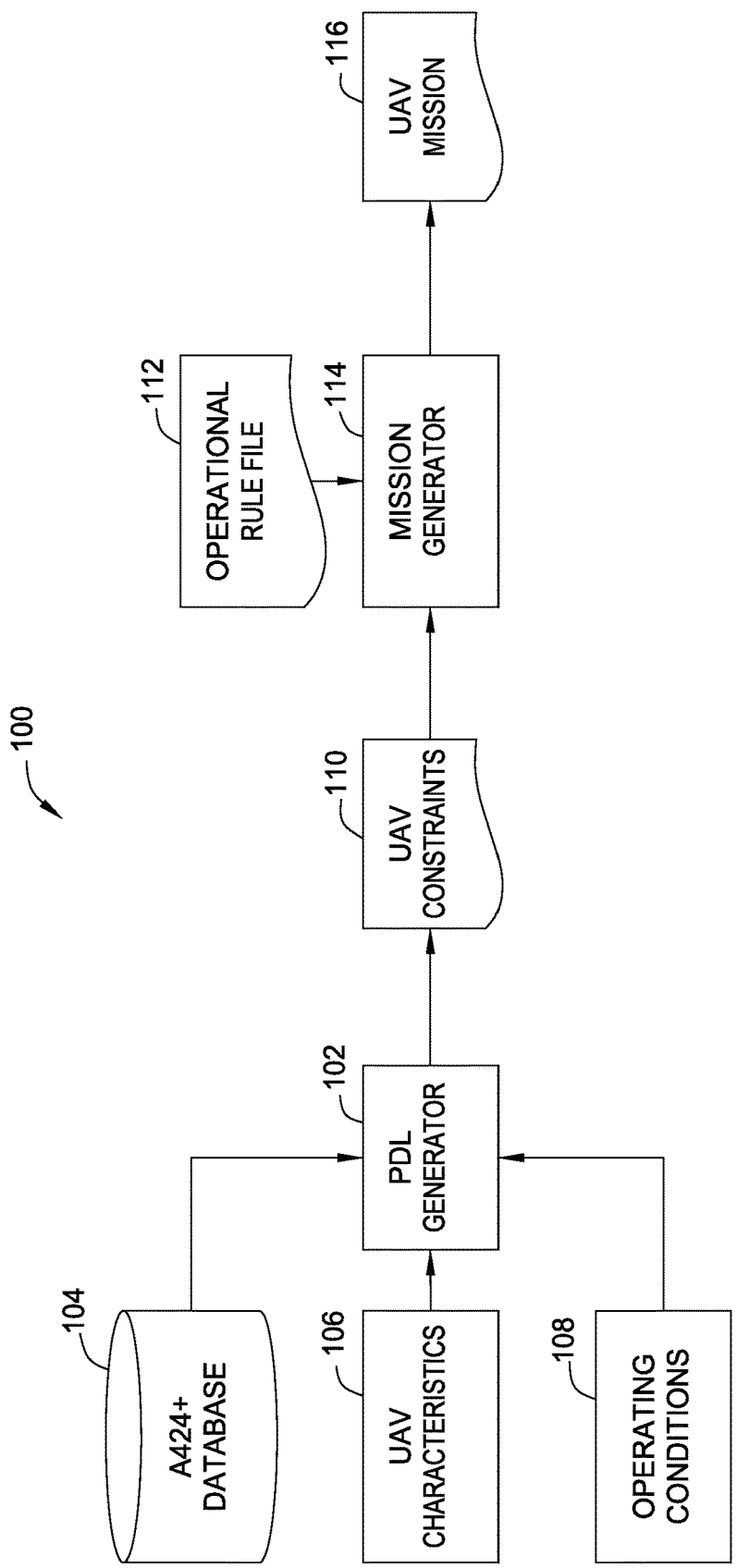
FIG. 1 is a block diagram illustrating a system for generating a mission for a UAV from a operational rule file and a procedure description language generator.

FIG. 1 illustrates a system 100 for generating a UAV mission. The system 100 includes a procedure description language (PDL) generator 102. The PDL generator 102 receives inputs from an ARINC 424+ database, which is an extension to the ARINC 424 database developed by Aeronautical Radio, Incorporated (ARINC), and which provides a standard for the preparation and transmission of data for assembly of airborne navigation system databases. The ARINC 242+ database can include navigation information, such as terrain information; map data that identifies addresses and/or latitudes and longitudes of residences, businesses, destinations, etc.; and area types, such as schools, government buildings, gas stations, bodies of water, etc. The PDL generator 102 also receives inputs from a UAV characteristics database 106, which provides capabilities and limitations of the UAV. For example, characteristics of the UAV could include its weight, range, duration, speed, altitude limits, and turn radius. The PDL generator also receives inputs from an operating conditions database 108, which provides environmental information that could affect the capabilities of the UAV. Examples of operating conditions information could include information related to air temperature, wind speed and direction, and precipitation. The PDL generator 102 uses the above referenced information to define constraints 110 of the UAV for a particular vehicle operation schedule. For example, a vehicle operation schedule could include a UAV carrying a payload from point A to point B, dropping the payload at point B, and returning to point A. The PDL generator 102 would be able to determine if such a vehicle operation schedule is possible based on the weight of the payload, the distance from A to B, the weather conditions, etc. The PDL generator 102 could take into account the capabilities of the UAV before and after the payload has been dropped at point B. For example, the UAV may use more of its fuel and/or battery power carrying the payload from point A to point B than it uses on the return trip from point B to point A without the payload. Thus, a vehicle operation schedule that calls the UAV to use more of its fuel and/or battery power to deliver the payload could be within the constraints 110 of the UAV as defined by the PDL generator 102. The UAV constraints 110 output by the PDL generator 102 are input to a mission generator 114.

The mission generator 114 also receives inputs from an operational rule file 112. The operational rule file 112 defines operating restrictions of the UAV based on one or more states of the UAV. For example, the UAV may be prohibited from flying over particular areas depending on the payload being carried by the UAV. For example, if the UAV is carrying a payload that is capable of generating considerable heat (e.g., lithium-ion batteries), then the UAV may be prohibited from flying over areas where flammable or other hazardous materials are present in large quantities. Here, a state of the UAV could be "carrying lithium-ion batteries" or "not carrying lithium-ion batteries" or could be "carrying potentially hot items" or "not carrying potentially hot items." If the UAV is carrying lithium-ion batteries, then the UAV may be prohibited from flying over gas stations, liquid oxygen storage tanks, and the like. As another example, a UAV carrying a payload that weighs more than a threshold amount (e.g., more than 1 pound) may be prohibited from flying over schools. Here, a state of the UAV could be "carrying a payload in excess of one pound" or "not carrying a payload in excess of one pound."

The mission generator 114 outputs the UAV mission 116 based on the inputs from the PDL generator 102 and the operational rule file 112. The PDL generator 102 defines where the UAV is capable of flying and the operational rule file 112 defines where the UAV is permitted to fly. Based on the capabilities and flight permissions for the UAV, the mission generator 114 can plot a vehicle operation plan (i.e., a flight plan) for a vehicle operation schedule. For example, the mission generator 114 could use the method of flight planning disclosed in U.S. Pat. No. 8,082,102, entitled "Computing flight plans for UAVs while routing around obstacles having spatial and temporal dimensions," the contents of which are incorporated herein in their entirety. The mission generator could generate the UAV mission 116 using one or more constraints, such as a shortest time constraint or a minimum cost constraint. The output UAV mission 116 satisfies the performance capabilities of the UAV and also the flight permissions for the UAV.

Figure 2:
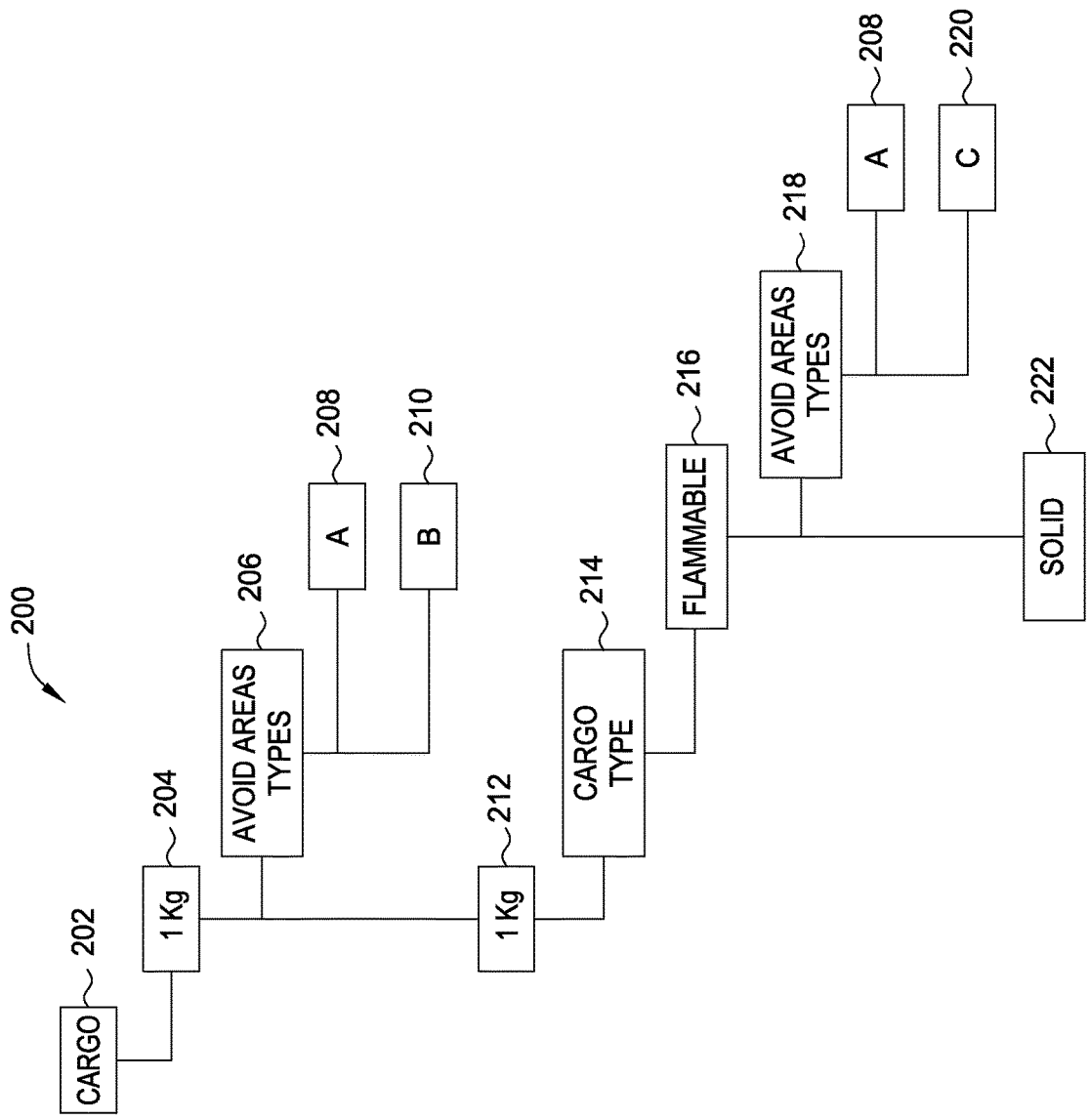
FIG. 2 is a block diagram of at least a portion of an exemplary operational rule file.

FIG. 2 illustrates a portion of an exemplary operational rule file 200 for a UAV that is organized as a logic tree. A first category in the operational rule file 200 is "cargo" 200. Under the "cargo" 202 category, there are two possible UAV states: cargo (i.e., payload) over one kilogram 204 and cargo under one kilogram 212. If a UAV is not carrying category payload, then the first category of the operational rule file 200 does not apply. For a UAV state in which the UAV is carrying cargo of more than one kilogram 204, there is an "avoid area types" restriction 206, and there are two area types: type "A" 208 and type "B" 210. Types "A" and "B" could be any area types where an object weighing more than one kilogram could cause unacceptable injury or damage if it were accidentally dropped or if the UAV encounters flight issues. Examples of such area types could include schools, playgrounds, car dealerships, etc. For example, type "A" areas 208 could be schools and type "B" areas 210 could be playgrounds. Thus, according to the operational rule file 200, a UAV carrying a payload that weighs more than one kilogram (i.e., a UAV having a "cargo in excess of one kilogram" state) would not be allowed to fly over school areas or playground areas. For the UAV state in which the UAV is carrying cargo weighing less than one kilogram 212, the cargo type 214 is an important consideration. The exemplary operational rule file 200 includes two cargo types 214: flammable cargo 216 and solid cargo 222. For a UAV having a flammable cargo 216 state there is an "avoid area types" restriction 218, and there are two area types to be avoided: type "A" 208 and type "C" 220. Continuing the example above, type "A" areas 208 could be schools and type "C" areas 220 could be gas stations. The solid cargo 222 could have other restrictions. Other cargo types could include poisonous or toxic cargo, radioactive cargo, and/or otherwise hazardous cargo.

In addition to defining rules based on cargo type, an operational rule file, such as the operational rule file 200 shown in FIG. 2, could include rules related to operational characteristics of the UAV. For example, the operational rule file could include rules related to function or malfunction states of the UAV. For example, the operational rule file could include rules limiting areas of travel if a motor for propulsion or control of the UAV is malfunctioning. As another example, the operational rule file could include rules limiting areas of travel if a battery of the UAV is below a certain charge level. As another example, the operational rule file could include rules limiting areas of travel if the UAV is out of contact with a ground based operator. Thus, the operational rule file provides operating restrictions on the UAV based on operation of the UAV and/or based on payloads being carried by the UAV.

In various aspects, the operational rule file could include rules that are always applicable regardless of the state of the UAV and/or the payload of the UAV. For example, the UAV may be prohibited from flying over military bases and government buildings, regardless of the cargo being carried or the operational status of the UAV.

Figure 3:
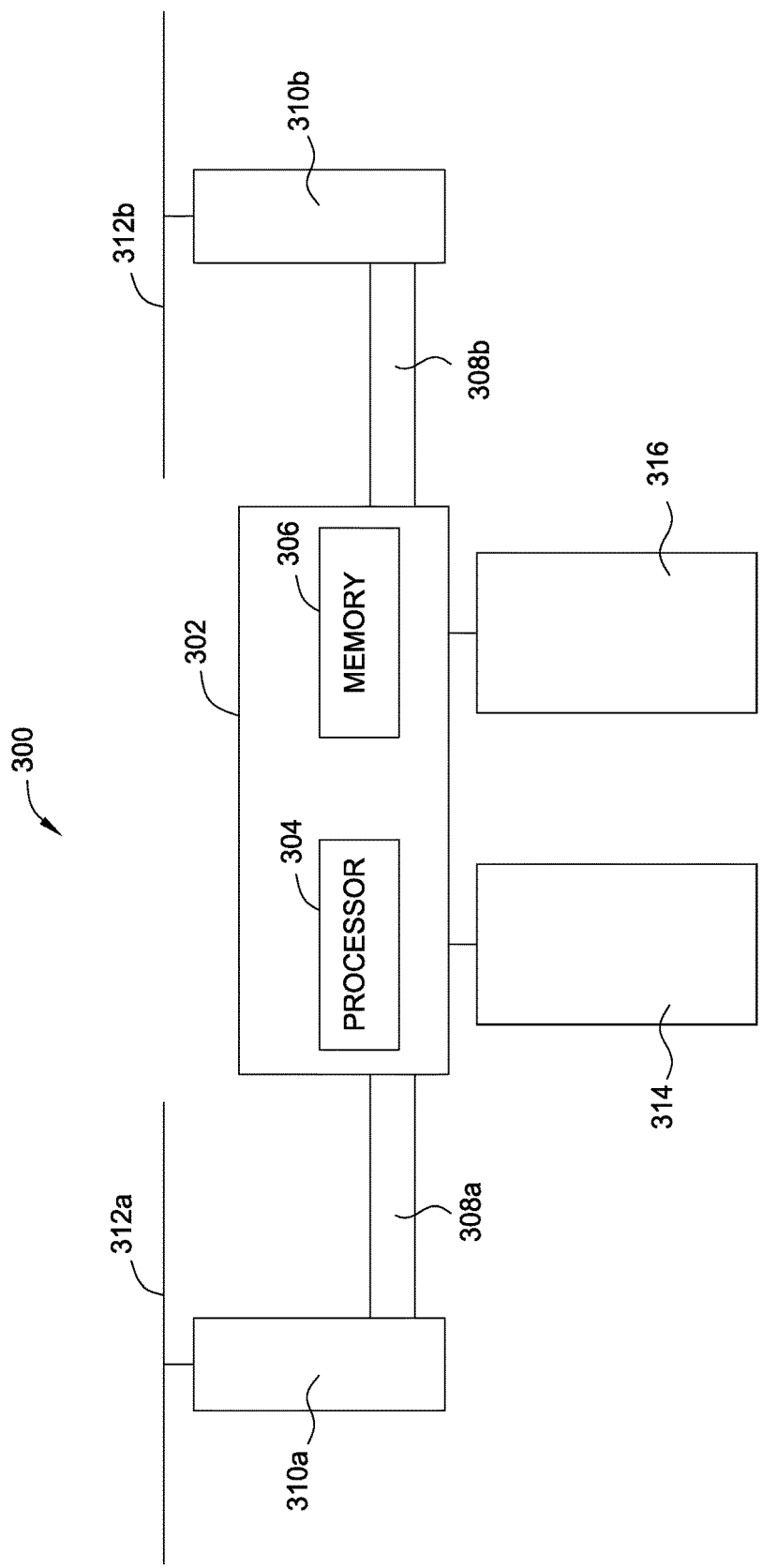
FIG. 3 is a schematic side view of a UAV according to at least one aspect.

FIG. 3 illustrates a side schematic view of a UAV in the form of a quad copter 300, according to at least one aspect. The quad copter 300 includes a housing or body 302 that includes a processor 304 and a memory 306. The quad copter 300 includes arms 308 extending from the body 302. Motors and propellers are attached to ends of the arms 308. In the side view of the quad copter 300, two arms 308, motors 310, and propellers 312 are visible. A first arm 308a extends from the body 302 with a first motor 310a and a first propeller 312a attached to a distant end of the first arm 308a. A second arm 308b extends from the body 302 with a second motor 310b and a second propeller 312b attached to a distant end of the second arm 308b. The quad copter 300 can include additional motors and propellers extending from additional arms. The processor 304 can send control commands to the flight components (i.e., the motors 310) to vary the speeds of the propellers to make the quad copter 300 climb, descend, and maneuver. The quad copter 300 can carry one or more payloads. The quad copter 300 is shown carrying a first payload 314 and a second payload 316. The quad copter 300 can selectively decouple from the first payload 314 and/or the second payload 316 so that the payloads 314 and 316 can be dropped off at destinations. In various aspects, a UAV helicopter could include more or fewer motors and propellers than four.

Figure 4:
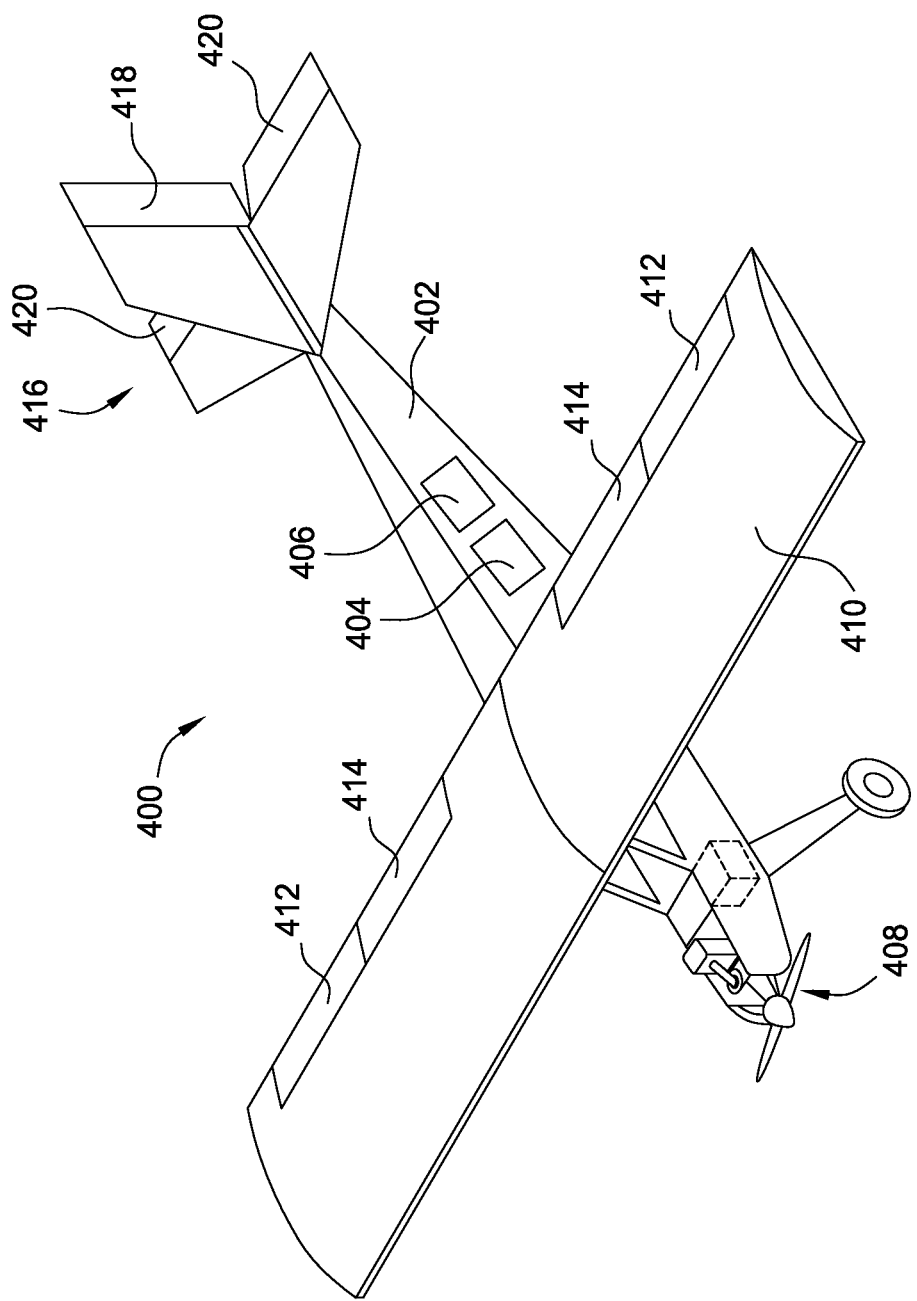
FIG. 4 is a perspective view of a UAV according to at least one aspect.

FIG. 4 illustrates a perspective view of a UAV in the form of a fixed wing aircraft 400, according to at least one aspect. The aircraft 400 includes a fuselage or body 402 that includes a processor 404 and a memory 406. The aircraft 400 includes an engine 408, a wing 410, and an empennage 416. The wing 410 generates lift for the aircraft 400 and includes ailerons 412 and flaps 414. The flaps 414 allow for increased lift at slower speeds (e.g., takeoff and landing speeds). The ailerons 412 allow for roll control of the aircraft 400. The empennage 416 includes a rudder 418 control surface and an elevator 420 control surface. The processor 404 can send control commands to the flight components (i.e., the engine 408, the ailerons 412, the flaps 414, the elevator 420, and the rudder 418) to control the aircraft 400. The aircraft 400 can carry one or more payloads, similar to the payloads 314 and 316 shown above in FIG. 3.

Figure 5:
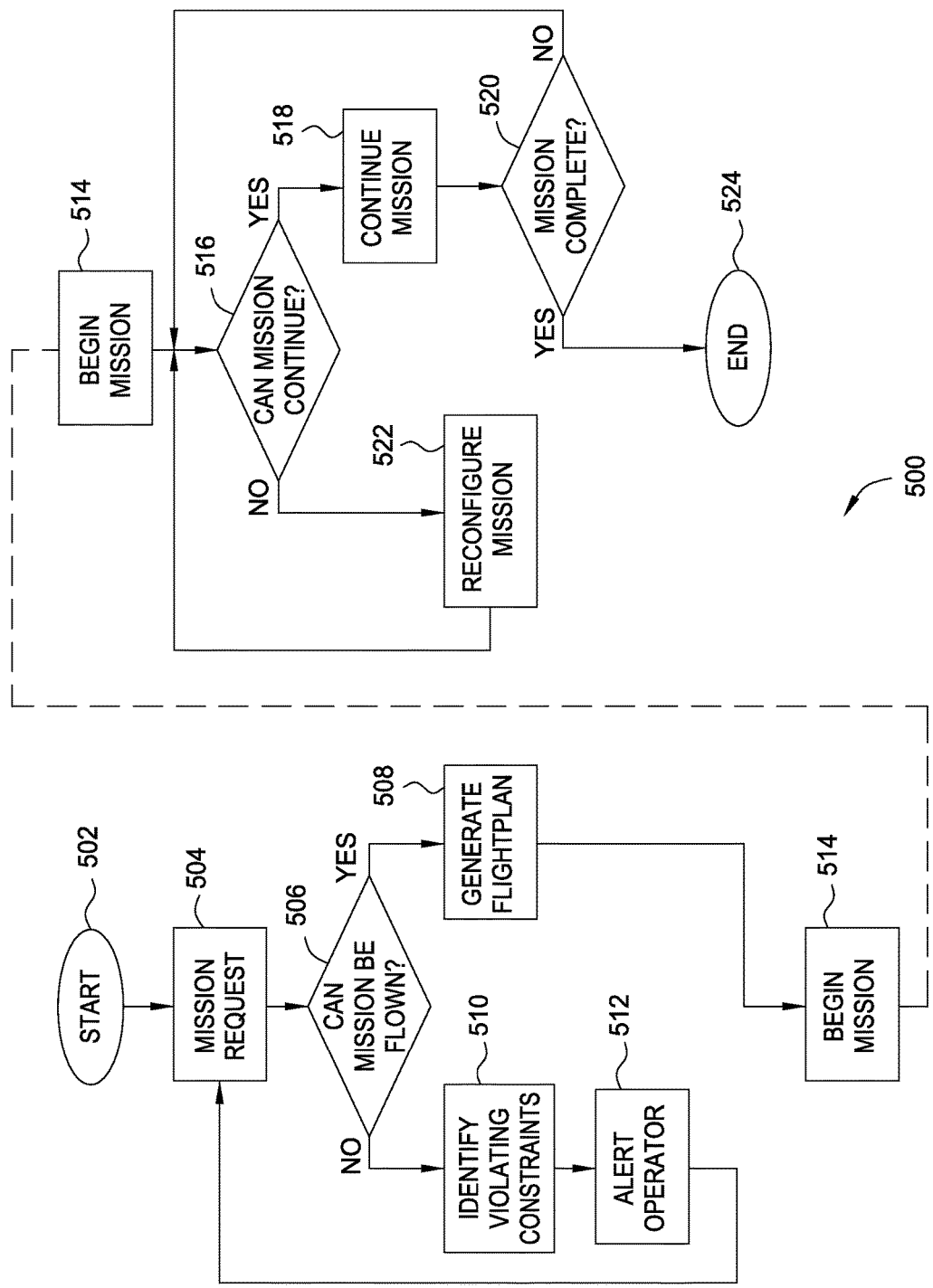
FIG. 5 is a flow chart of a method for generating a mission for a UAV and modifying the mission.

FIG. 5 illustrates a method 500, according to at least one aspect, for generating a vehicle operation plan based on a vehicle operation schedule and for modifying the vehicle operation plan during operation. The method 500 starts at block 502. Thereafter, a mission request is received in block 504. The mission request includes a vehicle operation schedule. For example, for a UAV, a vehicle operation schedule could call for the UAV to carry a payload from point A to point B, drop the payload at point B, and then return to point A. In block 506, the method 500 determines whether the mission can be flown. Referring again to FIG. 1, a PDL generator 102 and an operational rule file 112 can be applied to a mission generator 114, which attempts to generate a vehicle operation plan (e.g., a flight plan for a UAV) that satisfies the constraints of the PDL generator 102 and the operational rule file 112. Referring again to FIG. 5, if the method 500 determines that the mission cannot be flown in block 506, then the method 500 identifies violated constraints 510 and provides an alert to the operator in block 512. For example, the mission generator 114 may not be able to find a route that avoids areas as required by the operational rule file and that is also within the range of the UAV. The method 500 could output a message to the operator indicating the lack of a route within the range of the UAV. Optionally, the method 500 could end after providing the alert to the operator in block 512 or could return to the mission request block 504 to try a different mission request. Returning to block 506, if the mission can be flown, then in block 508 a vehicle operation plan (i.e., a flight plan) is generated. For example, the vehicle operation plan 508 could be the UAV mission 116 described above with reference to FIG. 1. In block 514, the mission begins.

After the UAV begins flying the mission in block 514, the processor on board the UAV (e.g., the processor 304 of the quad copter 300 shown in FIG. 3 with a processor 404 of the aircraft 400 shown in FIG. 4) periodically or continuously monitors the progress of the flight relative to the vehicle operation plan in block 516 to determine whether the mission can continue. For example, the processor on board the UAV can monitor the various payload and/or UAV states to determine whether any changes from expected states have affected an operating rule and/or the performance of the UAV. If there has been a change to a state of the payload from an expected state (i.e., an indication of a change in a state) or a chance in performance of the UAV from expected performance (i.e., an indication of a change in performance), then the processor can reconfigure the mission in block 522, if necessary. For example, memory onboard the UAV (e.g., memory for 306 for the quad copter 300 shown in FIG. 3 or memory 406 for the aircraft 400 shown in FIG. 4) could store the UAV constraints 110 or the PDL generator 102 and the operational rule file 112. The processor could access the UAV constraints, the PDL generator, and/or the operational rule file to develop a new vehicle operation plan based on the changed state of the payload and/or the UAV. Returning to block 516, if the mission can be continued, then in block 518 the mission is continued as planned. In block 520, the method 500 determines whether the mission has been completed. If the mission has been completed, then the method 500 ends in block 524. If the mission has not been completed, then the method 500 loops back to block 516 and continues to periodically or continuously determine whether the mission can continue according to the vehicle operation plan.

Referring again to block 522, in various instances, the UAV may not be able to reconfigure the mission in a manner that it completes some or all of its objectives. For example, the UAV may encounter winds or other weather that prevent it from reaching its destination. In such instances, reconfiguring the mission in block 522 could include canceling the planned mission and plotting a path to land at the nearest safe location.

FIGS. 6A and 6B illustrate an exemplary vehicle operation plan for a vehicle operation schedule for a UAV. FIG. 6A illustrates an exemplary vehicle operation plan for a UAV that, according to a vehicle operation schedule, flies from point 602 to point 604 to deliver a payload at point 604 and then return to point 602. FIG. 6A illustrates a vehicle operation plan for the vehicle operation schedule, based on UAV constraints (e.g., from a PDL generator) and an operational rule file. For example, FIG. 6A illustrates a region or region 606 that the UAV cannot fly through while carrying the payload. For example, the payload could weigh more than one kg and the region 606 could represent a school. As another example, the payload could pose a heat risk, and the region 606 could represent a gasoline station. The exemplary vehicle operation plan 600 therefore includes a first leg 608 and a second leg 610 that the UAV follows to get from point 602 to point 604. The first leg 608 and the second leg 610 direct the UAV around the region 606 to satisfy the operational rule from the operational rule file. The vehicle operation plan 600 includes a third leg 612 from point 604 to point 602. As discussed above, the operational rule file includes an operating restriction that prevents the UAV from flying over the region 606 while carrying the payload. After the UAV drops the payload at point 604, the UAV is free to fly the third leg 612 that crosses over the region 606.

Suppose that the UAV cannot drop the payload at point 604 as planned. Then, the UAV would have a state that has changed from an expected state. Specifically, an expected state of the UAV after arriving at point 604 is "no payload" and the actual state is "carrying payload in excess of one kilogram." As a result of the changed state, the UAV would be prevented from flying the third leg 612 of the vehicle operation plan 600. In various aspects, a processor on board the UAV can continuously or periodically check the states of the vehicle against the expected or planned states. For example, the processor could check the states for changes once every second, once every minute, ten times per second, or at any other suitable rate that enables the UAV to identify such changed states with sufficient time to reconfigure the mission. For example, with reference to FIG. 6A, the processor on board the UAV may need to check more frequently to determine whether the payload has been dropped if point 604 is very close to the borders of the region 606 because the UAV would quickly enter the region 606 (e.g., along leg 612) after departing from point 604 according to the original vehicle operation plan. By contrast, if point 604 is located some distance from the region 606, then the processor on board the UAV may check for changes to the states of the UAV less frequently because the UAV will take a longer amount of time to enter the region (e.g., along leg 612) after departing from point 604 according to the original vehicle operation plan. In various aspects, the processor on board the UAV is triggered to check for changes to states of the UAV from expected or planned states when the UAV reaches certain waypoints along the vehicle operation plan. For example, the processor could be triggered to check for changed states when the UAV reaches point 604 or immediately after the UAV departs from point 604. Referring to FIG. 5 again, in block 516, the processor in the UAV would determine that it cannot continue the planned mission (according to the current vehicle operation plan) because it cannot fly the third leg 612 over the region 606 based on the changed state. Thus, the UAV would reconfigure the mission (block 522 in FIG. 5). For example, the UAV could plot a revised vehicle operation plan that retraces the outbound path by flying the second leg 610 in reverse and then flying the first leg 608 in reverse to return to point 602. After reconfiguring the mission (in block 522), the processor in the UAV could output commands to follow leg 610 and then leg 608 to return to point 602.

In various aspects, the operational rule file can include rules that are desirable but not mandatory. For example, the region 606 could be classified as a desirable restriction, meaning that the UAV should not fly over the region 606 while carrying a payload, but such overflight would be allowed if necessary. For example, suppose the UAV begins the flight at point 602 but encounters unexpected strong winds such that the UAV would not have sufficient range to fly the original flight plan along the first leg 608 and the second leg 610 to arrive at point 604. As discussed above, a processor onboard the UAV could continuously or periodically check to determine whether a state of the UAV has changed from an expected or planned state. Here, the processor could check whether a range state of the UAV, determined by the PDL generator based on the wind conditions, has changed. Here, the range state could change from "sufficient range to fly current vehicle operation plan" to "insufficient range to fly current vehicle operation plan." At point 620 along the first leg 608, the UAV may modify the vehicle operation plan 600' to fly directly to point 604 over the region 606 to complete the mission. After dropping the payload off at point 604, the UAV may return to point 602 along the third leg 612, which also crosses over the region 606.

Figure 7B:
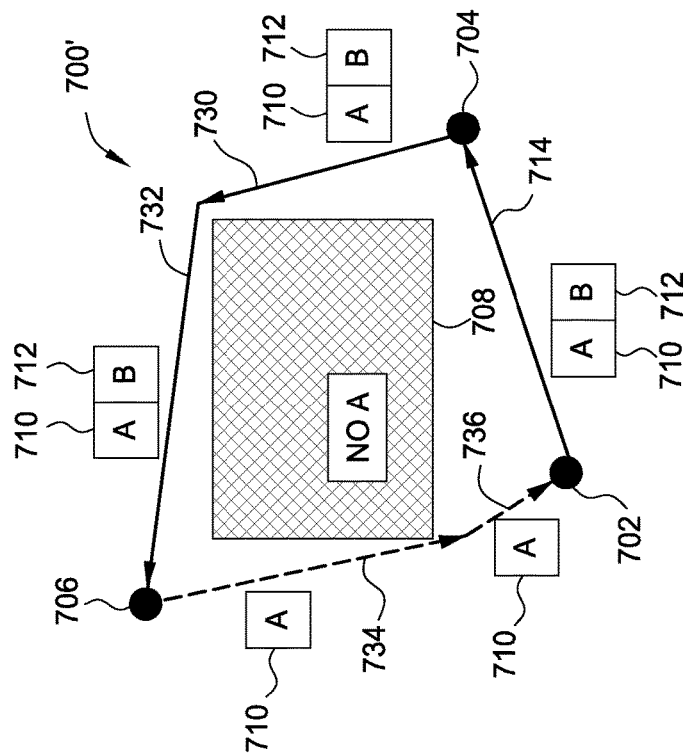
FIG. 7B is a top view of a second modified vehicle operation plan subject to an operational rule file and a procedure description language generator after an event changes the initial vehicle operation plan shown in FIG. 7A.
Figure 7A:
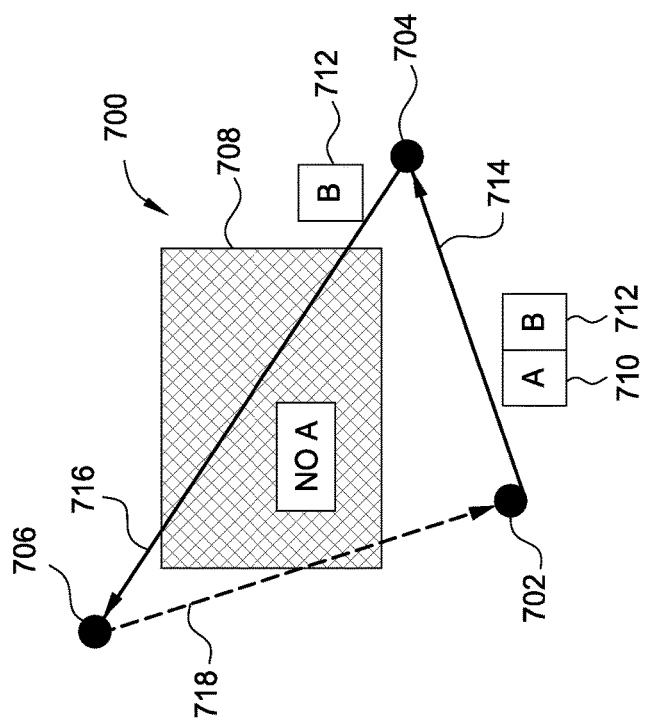
FIG. 7A is a top view of a second exemplary initial vehicle operation plan subject to an operational rule file and a procedure description language generator.

FIGS. 7A and 7B illustrate another exemplary vehicle operation plan for a vehicle operation schedule of a UAV, wherein the UAV is scheduled to depart from point 702, deliver a first payload "A" 710 at a first point 704, deliver a second payload "B" at a second point 706, and return to point 702. Points 704 and 706 are on opposite sides of a region 708 over which, according to an operational rule file, the UAV cannot fly while carrying payload "A" 710. In this exemplary scenario, the vehicle operation plan 700 calls for the UAV to fly from point 702 to point 704 along leg 714 while carrying the first payload "A" 710 and the second payload "B" 712. At point 704, the UAV will drop off payload "A" 710. Thereafter, the UAV will fly along leg 716 from point 704 to point 706 carrying payload "B" 712. After dropping payload "B" 712 at point 706, the UAV can return to point 702 along leg 718. The leg 716 from point 704 to point 706 and the leg 718 from point 706 to point 702 cross over the region 708. However, according to the vehicle operation plan 700, UAV will not be carrying the payload "A" 710 during those legs and can therefore cross over the region 708.

FIG. 7B illustrates an exemplary scenario in which the UAV changes the vehicle operation plan due to changes of the payload state from the planned payload state. Specifically, in this exemplary scenario, the UAV is unable to drop payload "A" 710 at point 704. When the UAV arrives at point 704 and cannot drop the payload "A" 710, it cannot continue the original vehicle operation plan 700 shown in FIG. 7A. Specifically, the UAV cannot fly the leg 716 that crosses over the region 708 because the operational rule file prevents the UAV from carrying the payload "A" 710 over the region 708. As discussed above, a processor on board the UAV can continuously or periodically check whether any states of the UAV changed from expected or planned states. The processor could also check the states of the UAV at certain milestones in the vehicle operation plan, such as upon reaching point 704. Referring again to FIG. 5, after determining that the mission cannot continue as planned in block 516, the UAV can autonomously reconfigure its vehicle operation plan in block 522. Specifically, the UAV can plot a route from point 704 to point 706 that goes around the region 708. In the reconfigured vehicle operation plan 700' shown in FIG. 7B, the UAV flies a leg 730 and then a leg 732 to go from point 704 to point 706. At point 706, the UAV can drop off payload "B" 712 as planned and thereafter return to point 702. Again, the UAV is still carrying payload "A" 710. Again, the processor on board the UAV can check the states of the UAV against the expected and/or planned states. Here, the UAV is still carrying payload "A" 710 and the operational rule file prevents the UAV from carrying the payload "A" 710 over the region 708. Therefore, the UAV modifies the planned leg 718 from point 706 to point 702. Here, the UAV can plot a route from point 706 to point 702 that goes around the region 708. In the reconfigured vehicle operation plan 700', the UAV flies a leg 734 and then a leg 736 to go from point 706 to point 702.

The exemplary scenarios depicted in FIGS. 6A-6B and 7A-7B are intended to illustrate use of a PDL generator and an operational rule file in the planning and re-planning of a mission for a UAV, based on changes of vehicle and/or payload states from planned states. The exemplary scenarios are not intended to be limiting, and other scenarios are contemplated and deemed to be within the scope of the disclosure herein.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to aspects. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects of the invention may be devised without departing from the basic scope thereof, and the scope thereof is determined by the claims that follow.

What is claimed is:

1. A computer-implemented method, comprising:
receiving a procedure description for a vehicle, the procedure description defining performance constraints of the vehicle;
receiving at least one operational rule defining vehicle operating restrictions based on states of the vehicle;
receiving a vehicle operation schedule for the vehicle that includes one or more planned states of the vehicle during the vehicle operation schedule;
extracting one or more vehicle operating restrictions from the at least one operational rule for the vehicle based on the one or more planned states of the vehicle;
generating a vehicle operation plan, based on the vehicle operation schedule, that satisfies the performance constraints and extracted vehicle operating restrictions; and
providing instructions to the vehicle such that the vehicle executes the vehicle operation plan.

2. The method of claim 1, further comprising:
during operation of the vehicle, receiving an indication of a change to a performance constraint of the vehicle from a planned performance constraint;
generating a revised vehicle operation plan that satisfies the changed performance constraint; and
providing revised instructions to the vehicle such that the vehicle executes the revised vehicle operation plan.

3. The method of claim 2, further comprising:
during operation of the vehicle, receiving an indication of a change to a state of the vehicle from the one or more planned states for the vehicle operation schedule;
extracting a different one or more vehicle operating restrictions from the at least one operational rule based on the change to the state;
generating a second revised vehicle operation plan that satisfies the different one or more vehicle operating restrictions from the operational rule; and
providing second revised instructions to the vehicle such that the vehicle executes the second revised vehicle operation plan.

4. The method of claim 1, further comprising:
during operation of the vehicle, receiving an indication of a change to a state of the vehicle from the one or more planned states for the vehicle operation schedule;
extracting a different one or more vehicle operating restrictions from the at least one operational rule based on the change to the state;
generating a revised vehicle operation plan that satisfies the different one or more vehicle operating restrictions from the at least one operational rule and
providing revised instructions to the vehicle such that the vehicle executes the revised vehicle operation plan.

5. The method of claim 1, wherein the states of the vehicle include at least one of: whether a payload is being carried; whether a payload being carried is hazardous; whether a payload being carried is toxic or poisonous; whether a payload being carried is a fire hazard; and whether the vehicle is in communication with a human operator.

6. The method of claim 5, wherein the vehicle is an unmanned aerial vehicle (UAV), and wherein the vehicle operating restrictions include regions through which the UAV cannot fly based on a state of the UAV.

7. The method of claim 5, wherein the performance constraints includes at least one of: a range of the vehicle; a turning radius of the vehicle; a maximum speed of the vehicle; and a maximum altitude of the vehicle.

8. A system, comprising:
an unmanned aerial vehicle (UAV) with flight components;
a computer-readable storage medium arranged on board the UAV and adapted to store:
procedure description data for the UAV, wherein the procedure description data defines performance constraints of the UAV;
operational rule data, wherein the operational rule data defines vehicle operating restrictions based on states of the UAV; and
a vehicle operation plan for the UAV that includes one or more planned states of the UAV during the vehicle operation plan, wherein the vehicle operation plan satisfies the performance constraints and the vehicle operating restrictions; and
a computer processor on board the UAV and operable to:
generate control commands for the flight components such that the UAV executes the vehicle operation plan; and
output the control commands to the flight components.

9. The system of claim 8, wherein the computer processor is further operable to generate the vehicle operation plan by:
receiving a vehicle operation schedule that includes one or more planned states of the UAV during the vehicle operation schedule;
extracting one or more vehicle operating restrictions from the operational rule data for the UAV based on the one or more planned states of the UAV; and
generating the vehicle operation plan, based on the vehicle operation schedule, that satisfies the performance constraints and the extracted vehicle operating restrictions.

10. The system of claim 9, wherein the computer processor is further operable to:
during operation of the UAV, receive an indication of a change to a performance constraint of the UAV from a planned performance constraint;
generate a revised vehicle operation plan that satisfies the changed performance constraint;

generate revised control commands such that the vehicle executes the revised vehicle operation plan; and output the revised control commands to the at least one of a propulsion system and control surfaces.

11. The system of claim 10, wherein the computer processor is further operable to:

during operation of the UAV, receive an indication of a change to a state of the UAV from the one or more planned states for the vehicle operation schedule;

extract a different one or more vehicle operating restrictions from the operational rule data based on the change to the state;

generate a second revised vehicle operation plan that satisfies the different one or more vehicle operating restrictions from the operational rule data;

generate second revised control commands such that the vehicle executes the second revised vehicle operation plan; and output the second revised control commands to the at least one of the propulsion system and the control surfaces.

12. The system of claim 8, wherein the computer processor is further operable to:

during operation of the UAV, receive an indication of a change to a state of the UAV from the one or more planned states for a vehicle operation schedule;

extract a different one or more vehicle operating restrictions from the operational rule data based on the change to the state;

generate a revised vehicle operation plan that satisfies the different one or more vehicle operating restrictions from the operational rule data;

generate revised control commands such that the vehicle executes the revised vehicle operation plan; and output the revised control commands to the at least one of a propulsion system and control surfaces.

13. The system of claim 8, wherein the states of the vehicle include at least one of: whether a payload is being carried; whether a payload being carried is hazardous; whether a payload being carried is toxic or poisonous; whether a payload being carried is a fire hazard; and whether the vehicle is in communication with a human operator.

14. The system of claim 13, wherein the vehicle operating restrictions include regions through which the UAV cannot fly based on a state of the UAV.

15. The system of claim 8, wherein the performance constraints includes at least one of: a range of the vehicle; a turning radius of the vehicle; a maximum speed of the vehicle; and a maximum altitude of the vehicle.

16. A computer program product for planning a vehicle operation, the computer program product comprising:

a non-transitory computer-readable medium having computer-readable program code embodied therewith, the computer-readable program code executable by one or more computer processors to:

receive a vehicle operation schedule for the vehicle that includes one or more planned states of the vehicle during the vehicle operation schedule;

retrieve performance constraints for the vehicle from procedure description data;

retrieve vehicle operating restrictions for the vehicle, based on the planned states of the vehicle, from operational rule data;

generate a vehicle operation plan, based on the received vehicle operation schedule, that satisfies the performance constraints and extracted vehicle operating restrictions; and output instructions to the vehicle such that the vehicle executes the vehicle operation plan.

17. The computer program product of claim 16, wherein the computer-readable program code is further executable to:

during operation of the vehicle, receive an indication of a change to a performance constraint of the vehicle from a planned performance constraint;

generate a revised vehicle operation plan that satisfies the changed performance constraint; and provide revised instructions to the vehicle such that the vehicle executes the revised vehicle operation plan.

18. The computer program product of claim 17, wherein the computer-readable program code is further executable to:

during operation of the vehicle, receive an indication of a change to a state of the vehicle from the one or more planned states for the vehicle operation schedule;

extract a different one or more vehicle operating restrictions from the operational rule data based on the change to the state;

generate a second revised vehicle operation plan that satisfies the different one or more vehicle operating restrictions from the operational rule data; and provide second revised instructions to the vehicle such that the vehicle executes the second revised vehicle operation plan.

19. The computer program product of claim 16, wherein the computer-readable program code is further executable to:

during operation of the vehicle, receiving an indication of a change to a state of the vehicle from the one or more planned states for the vehicle operation schedule;

extracting a different one or more vehicle operating restrictions from the operational rule data based on the change to the state;

generating a revised vehicle operation plan that satisfies the different one or more vehicle operating restrictions from the operational rule data; and providing revised instructions to the vehicle such that the vehicle executes the revised vehicle operation plan.

20. The computer program product of claim 16, wherein the states of the vehicle include at least one of: whether a payload is being carried; whether a payload being carried is hazardous; whether a payload being carried is toxic or poisonous; whether a payload being carried is a fire hazard; and whether the vehicle is in communication with a human operator.

* * * * *